(12) United States Patent
Catalano

(10) Patent No.: US 12,359,638 B2
(45) Date of Patent: Jul. 15, 2025

(54) CONTROL OF INJECTION PRESSURE FOR HIGH PRESSURE DIRECT INJECTION SYSTEMS

(71) Applicant: VOLVO TRUCK CORPORATION, Gothenburg (SE)

(72) Inventor: Gabriele Catalano, Hagerstown, MD (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 113 days.

(21) Appl. No.: 18/483,901

(22) Filed: Oct. 10, 2023

(65) Prior Publication Data
US 2024/0125280 A1   Apr. 18, 2024

(30) Foreign Application Priority Data
Oct. 17, 2022   (EP) .................................... 22201877

(51) Int. Cl.
*F02D 41/30*   (2006.01)
*F02D 19/02*   (2006.01)
(Continued)

(52) U.S. Cl.
CPC ....... *F02D 41/1401* (2013.01); *F02D 35/023* (2013.01); *F02D 41/0027* (2013.01);
(Continued)

(58) Field of Classification Search
CPC ............... F02D 41/0027; F02D 19/022; F02D 19/0644; F04D 41/30
See application file for complete search history.

(56) References Cited

U.S. PATENT DOCUMENTS

| | | | | |
|---|---|---|---|---|
| 5,392,740 A | * | 2/1995 | Teramoto | ................ F02B 43/00 123/3 |
| 2008/0099002 A1 | * | 5/2008 | Boyer | ................. F02D 41/0027 123/527 |

(Continued)

FOREIGN PATENT DOCUMENTS

| DE | 102016111696 A1 | 1/2017 |
|---|---|---|
| EP | 2834506 B1 | 10/2017 |
| JP | 2006105088 A | 4/2006 |

OTHER PUBLICATIONS

Extended European Search Report in corresponding European Application No. 22201877.2 dated Apr. 6, 2023 (8 pages).

*Primary Examiner* — Long T Tran
(74) *Attorney, Agent, or Firm* — Venable LLP; Jeffri A. Kaminski

(57) ABSTRACT

A computer-implemented method for controlling direct injection of hydrogen fuel into an engine cylinder of a vehicle from a hydrogen tank via an injector system. The method includes determining a present hydrogen pressure in the hydrogen tank; determining a present requested engine torque and speed; determining a target injection pressure for injecting hydrogen into the engine combustion chamber using a model the target injection pressure is the injection pressure that, according to the model, minimizes the mechanical work of the compressor, that provides an in-cylinder pressure sufficient for the engine to provide the requested engine torque and speed, that provides NOx emission below a predetermined maximum NOx emission level, and that reduces engine fuel consumption, and adjusting the injector pressure according to the determined target injection pressure.

19 Claims, 6 Drawing Sheets

(51) Int. Cl.
*F02D 35/02* (2006.01)
*F02D 41/00* (2006.01)
*F02D 41/14* (2006.01)
*F02D 41/24* (2006.01)

(52) U.S. Cl.
CPC ..... *F02D 41/2422* (2013.01); *F02D 41/2467* (2013.01); *F02D 2041/1433* (2013.01); *F02D 2200/0602* (2013.01); *F02D 2200/0802* (2013.01); *F02D 2200/1002* (2013.01); *F02D 2200/101* (2013.01); *F02D 2250/36* (2013.01)

(56) References Cited

U.S. PATENT DOCUMENTS

| | | |
|---|---|---|
| 2009/0120385 A1 | 5/2009 | Munshi et al. |
| 2010/0268442 A1* | 10/2010 | Kabashima ......... F02D 41/0025 123/3 |
| 2011/0088655 A1* | 4/2011 | Ancimer ............ F02D 41/0027 123/299 |
| 2012/0160221 A1* | 6/2012 | Munshi .............. F02M 21/0206 123/575 |
| 2020/0271068 A1* | 8/2020 | Dodis ..................... F02D 41/20 |
| 2021/0025304 A1* | 1/2021 | Charbonnel ............. F01N 3/10 |
| 2021/0246845 A1* | 8/2021 | Pouring ............. F02D 41/1452 |
| 2022/0049668 A1* | 2/2022 | Prümm ............... F02D 41/0027 |
| 2022/0349358 A1* | 11/2022 | Minaz ................ F02D 41/1405 |
| 2023/0025982 A1* | 1/2023 | Redon ...................... F01B 7/14 |
| 2023/0265786 A1* | 8/2023 | Redon ................... F02B 43/10 123/51 A |

* cited by examiner

CONTROL OF INJECTION PRESSURE FOR HIGH PRESSURE DIRECT INJECTION SYSTEMS

TECHNICAL FIELD

The present disclosure relates to a method for controlling the operation of direct injection of hydrogen into engine cylinder. The present disclosure also relates to a corresponding injector system, a computer program, a vehicle, and a control unit. Although the method and system will be described in relation to a vehicle in the form of a truck, the method and system can also be efficiently incorporated in other vehicle types such as busses, light-weight trucks, passenger cars, construction equipment, marine vessels, and industrial equipment.

BACKGROUND

For a hydrogen engine using direct injection a relatively high pressure of the injected hydrogen is required to ensure proper injection. To provide such high injection pressure a compressor is typically employed. However, the compressor is power consuming and will contribute to a loss of the overall vehicle performance and may increase the fuel consumption of the engine.

Accordingly, there is a need for improvements with regards to reducing the losses of using compressors for high pressure direct injection in hydrogen engines.

SUMMARY

The disclosure aims to provide a method for controlling the operation of direct injection of hydrogen into engine cylinder that at least partly alleviates the deficiencies with the prior art.

According to the first aspect, there is provided a computer-implemented method for controlling direct injection of hydrogen fuel into an engine cylinder of a vehicle from a hydrogen tank via an injector system, the method comprising: determining a present hydrogen pressure in the hydrogen tank; determining a present requested engine torque and speed; determining a target injection pressure for injecting hydrogen into the engine combustion chamber using a model that includes at least: a mapping of engine fuel consumption as a function of injection pressure; a mapping between NOx emission as a function of injection pressure, a mapping of in-cylinder pressure as a function of engine torque and speed; a mapping of compressor mechanical work required to eject and compress hydrogen from the hydrogen tank as a function of injection pressure; wherein, the target injection pressure is the injection pressure that, according to the model, minimizes the mechanical work of the compressor, that provides an in-cylinder pressure sufficient for the engine to provide the requested engine torque and speed, that provides NOx emission below a predetermined maximum NOx emission level, and that reduces engine fuel consumption, wherein the method further comprises: adjusting the injector pressure according to the determined target injection pressure.

The inventor realized to provide a model that balances the need for sufficiently high injection pressure to overcome the in-cylinder pressure so that the hydrogen gas can be injected into the cylinder, with the overall efficiency loss to use the compressor. For this, a set of mappings between parameters that are affected by the injection pressure and that are subject to constraints or that affect the efficiency of the overall engine are provided. For example, the level of NOx is subject to a maximum emission level that sets a limit to the injection pressure. Further, it may be desirable to minimize the fuel consumption while at the same time be able to provide the requested engine torque and vehicle speed. The balancing in particular takes the mechanical work or energy required to operate the compressor into account. Accordingly, the examples provided herein provide for finding the optimal, target, injection pressure that injects the hydrogen gas with the minimal amount of energy loss, while fulfilling a set of constraints. The set of constraints are understood to include to provide an in-cylinder pressure sufficient for the engine to provide the requested engine torque and speed, to provide a NOx emission level below a predetermined maximum NOx emission level, and that reduces engine fuel consumption. Reducing engine fuel consumption can be understood as minimizing the engine fuel consumption.

A mapping can be a predetermined function of the suggested parameters. The mapping can be modelled from simulations or theoretical models, or it is envisaged that the mappings are empirically determined from experimental measurements, of the mappings may be determined from data sheets of the respective components and devices.

The proposed examples herein are advantageously used for so-called mid to high pressure fuel injection systems, where the term mid to high pressure suggests that the hydrogen is injected in the combustion chamber at a pressure higher than 30 bar up to 400 bar The engine of the vehicle is an internal combustion hydrogen engine. The internal combustion engine may be part of a hybrid driveline partly powered by a battery.

According to an example, each mapping may have an associated weighting factor to adjust the relative importance between the maps, at least two of the weighting factors being different from each other. In other words, in some situations it may be preferred to ensure that the NOx emission level is maintained low, perhaps with a set margin to the maximum allowed emission level. In other situations, it may be more desirable to ensure that the fuel consumption is maintained at a minimum, whereby the weigh for the fuel consumption is set relatively higher than the weights for the other maps. The weights may be variable by a user or an algorithm to tune the relative importance between the maps based on present for example driving conditions, a present route, or a present amount of fuel in the tank, to find a suitable weighting between the maps. For example, the to reduce the fuel consumption may be the target if the level in the tank is low. Reducing NOx may be weighted higher if a present route is a relatively longer-range drive.

According to an example, the model may include assigned boundaries for each mapping. That is, each mapping may have an upper and/or lower boundary which each parameter is not allowed to exceed or fall below. The boundaries may for example be out of range for a given parameter, or may relate to legal requirements, or manually set boundaries for avoiding for example unreasonably high fuel consumption. Furthermore, the boundaries may facilitate the minimization of the mechanical work which may otherwise provide unreasonable results.

According to an example, the model may further include a mapping between a diesel pressure used for hydrogen ignition and injection pressure, wherein a further constraint for determining the target injection pressure is set by a required diesel pressure. Thus, it is envisaged that further mappings may be included to further improve the efficiency of the overall engine system.

According to an example, a further constraint may be that the hydrogen injection pressure is lower than the required diesel pressure. This is to ensure that the hydrogen is not forced into the diesel reservoir.

According to an example, the method may comprise determining a present engine aftertreatment system temperature, wherein when the method is only operative when the engine aftertreatment system temperature exceeds a threshold indicating that the engine aftertreatment system is operative. It is envisaged that the suggested method is most efficient and accurate when the engine has reached a normal working temperature.

According to an example, the method may comprise monitoring a pressure in the hydrogen tank, and only use the model for determining the target injection pressure when the pressure in the hydrogen tank is below a pressure threshold. When the hydrogen tank is recently refilled, that is, when the hydrogen tank is full or nearly full, there is no need to pressurize the tank using the compressor. However, when the pressure drops too much, the compressor is required to ensure efficient injection into the cylinder even at lower pressures.

It is also envisaged that the method may include determining that the pressure in the hydrogen tank is below a pressure threshold, and only use the model for determining the target injection pressure when the pressure in the hydrogen tank is below a pressure threshold.

According to an example, the pressure threshold may be the in-cylinder pressure. Thus, once the pressure in the tank falls below the pressure in the cylinder, it is required to pressurize the tank to ensure that the hydrogen gas can overcome the cylinder pressure to be injected into the cylinder.

According to an example, the model may include a self-learning algorithm configured to adapt the injector pressure based on the amount of fuel in the tank. The self-learning algorithm may learn from training, how frequently a driver or truck owner operates the vehicle with low hydrogen tank pressures. Based on this training, the self-learning algorithm can predict when it is suitable to run the method to optimize the injection pressure. Example self-learning algorithms include auto encoders or other artificial neural networks such as support vector machines and convolutional neural networks, or other fitted empirical models. The self-learning algorithm may be adapted to collect data with information on the truck operator behaviour, for instance how frequently he/she will refill the truck, to understand how critical it is to save fuel to ensure the completion of a next or present journey. The algorithm may also be configured to learn which is the most common route for the truck, and if the algorithm concludes that the route is often the same, it may optimize the fuel consumption based on the length, distance between refilling stations and topology of the route.

According to an example, the model may be configured to collect data of compressor usage, and to further adapt the injector pressure based on average usage of the compressor. If there is a trend showing how the gas compressor is generally used during an average trip, then the model may advantageously be used based on this. For instance, if the algorithm can predict that the truck will shortly reach a downhill zone and after that a parking zone, then it will stop compressing hydrogen, just before the downhill.

According to an example, the target injection pressure may be the injection pressure that provides the lowest amount of fuel needed to fulfil an engine torque request with the lowest efficiency loss in a compressor providing the injection pressure.

According to an example, the model may be predetermined and loaded on a memory of the vehicle. Alternatively, the model may be retrieved from a server when it is needed.

According to an example, the target injection pressure may depend on a present driving condition of the vehicle. For example, the target injection pressure may be further adapted depending on road conditions and weather. Moreover, the target injection pressure may be further adapted depending on the remaining fuel in the tank and the estimated time to arrival at destination.

According to an example, adjusting the injector pressure may be performed by controlling an operation of a compressor arranged to control the injector pressure.

According to a second aspect, there is provided a control unit for controlling direct injection of hydrogen fuel into an engine cylinder of a vehicle from a hydrogen tank via an injector system, the control unit being configured to perform the steps of the method according to the first aspect.

According to a third aspect, there is provided an injector system for direct injection of hydrogen into an engine cylinder of a vehicle from a hydrogen tank, the system comprising: an injector; a hydrogen tank connected to the injector with piping to supply hydrogen gas to the injector, and a control unit according to the second aspect.

According to a fourth aspect there is provided a vehicle comprising the injector system according to the third aspect.

According to a fifth aspect, there is provided a computer program product comprising program code for performing, when executed by the processor device, the method of the first aspect when the program is run on a computer.

According to a sixth aspect, there is provided a non-transitory computer-readable storage medium comprising instructions, which when executed by the processor device, cause the processor device to perform the method of the first aspect.

Effects and features of the second, third, fourth, fifth, and sixth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the disclosure cited as examples.

In the drawings.

DETAILED DESCRIPTION OF EXAMPLES OF THE DISCLOSURE

Figure 1:
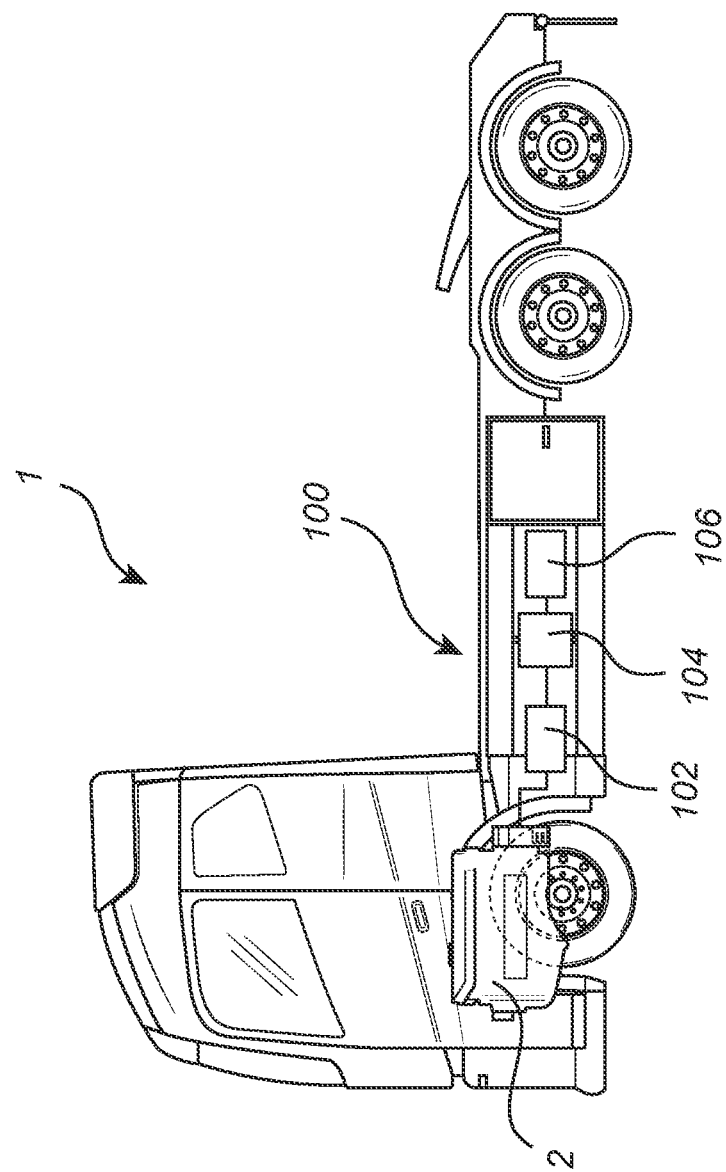
FIG. 1 is a vehicle in the form a truck according to examples of the disclosure.

Examples of the present disclosure will now be described more fully hereinafter with reference to the accompanying drawings, in which examples of the disclosure are shown. The examples may, however, be embodied in many different forms and should not be construed as limited to the examples set forth herein; rather, these examples are provided for thoroughness and completeness. The skilled person will recognize that many changes and modifications may be made within the scope of the appended claims. Like reference character refer to like elements throughout the description.

FIG. 1 illustrates a vehicle in the form of a truck 1 comprising an engine 2 such as for example an internal combustion engine. The internal combustion engine is a hydrogen engine 2. The truck 1 may be a hybrid electric vehicle. Further, the truck 1 comprising an injector system 100 for direct injection of hydrogen into an engine cylinder of the engine 2. The injector system 100 comprises one or more injectors 102 that receive pressurized hydrogen gas from a hydrogen tank 104.

During engine operation the in-cylinder pressure is relatively high. To ensure efficient direct injection of hydrogen gas into the cylinder, the pressure of the pressurized hydrogen gas must overcome the pressure in the cylinder. When the hydrogen gas is filled to a certain level, that is, the pressure in the hydrogen gas may be sufficiently high to overcome the in-cylinder pressure, preferably with some margin. However, as the pressure decreases as the engine combusts the hydrogen gas, the pressure in the hydrogen tank 104 may become too low for efficient injection into the cylinder volume. When this occurs, a compressor 106 may be used for compressing the hydrogen tank 104 so that more hydrogen gas can be withdrawn from the hydrogen tank 104. This provides for using more of the hydrogen gas in the tank 104 which extends the range of the vehicle 1. However, the compressor 106 requires power and is thus a source of power loss for the vehicle. The present disclosure provides for more efficient use of the compressor 106.

Figure 2:
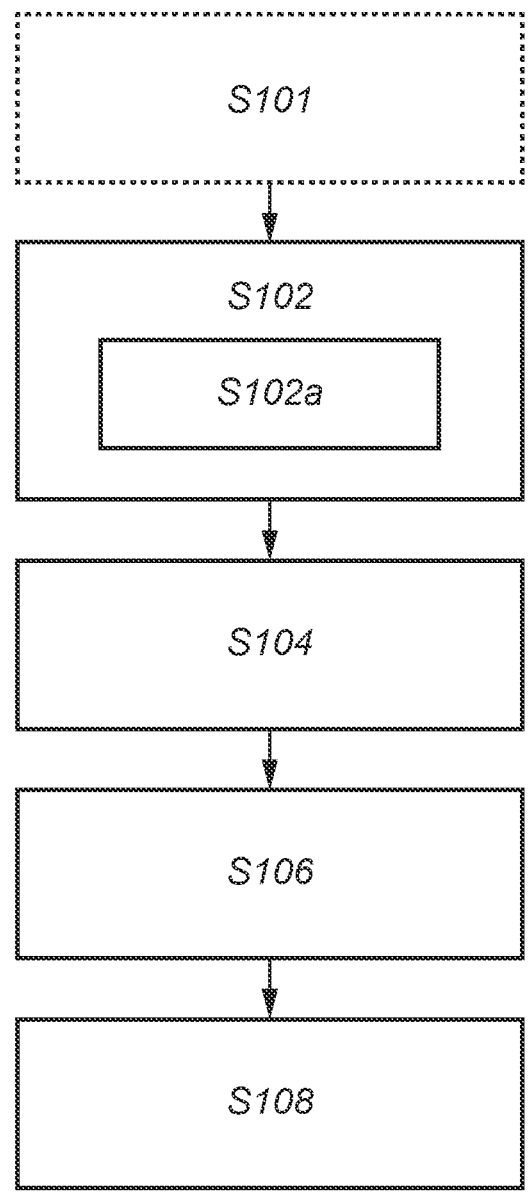
FIG. 2 is a flow-chart of method steps according to examples of the disclosure.
Figure 3:
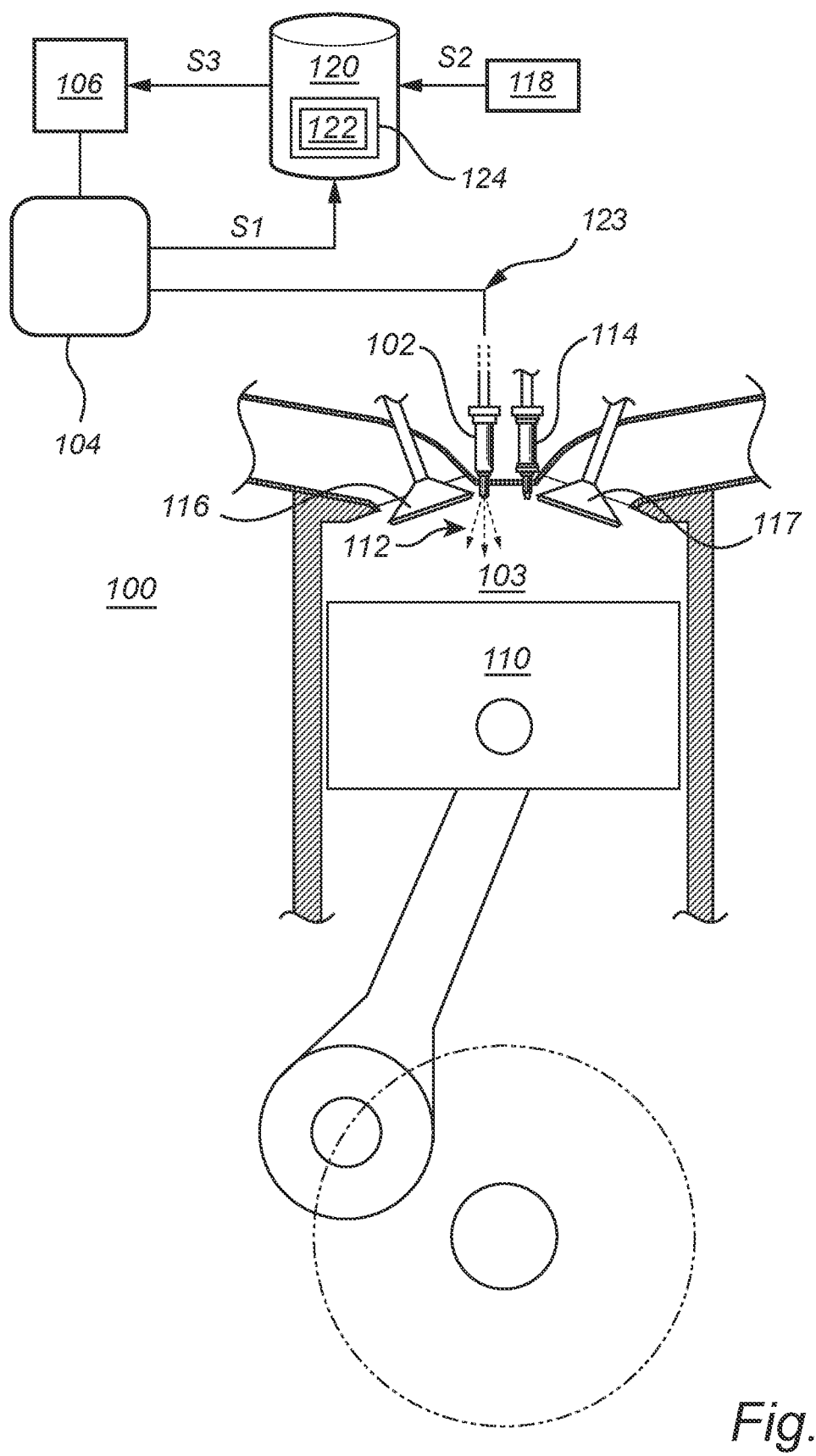
FIG. 3 is a schematic illustration of an injector system according to examples of the disclosure.

FIG. 2 is a flow-chart of method steps according to examples of the disclosure and FIG. 3 conceptually illustrates an injector system 100 according to examples of the disclosure.

The injector system 100 comprises an injector 102 for direct injection of hydrogen into an engine cylinder 103 of a vehicle from a hydrogen tank 104. In the cylinder, a piston 110 is arranged to compress the hydrogen gas 112 injected by the injector and an ignition device 114 is configured to timely ignite the hydrogen gas 112. The injector system 100 further comprises a hydrogen tank 104 which stores pressurized hydrogen gas and that it configured to supply hydrogen gas to the injector 102 via transfer lines, or piping, 123. An inlet valve arrangement 116 of the cylinder is arranged to open and close an air inlet of the cylinder 103 and an outlet valve arrangement 117 of the cylinder is arranged to open and close an exhaust outlet of the cylinder 103. The injector 102 is controlled by an engine control circuitry not shown here of discussed in further detail herein. The control of the combustion cycle can take different forms are several options are considered known per se to the skilled person.

Furthermore, the injector system 100 comprises a control unit 120 that receives pressure sensing signals S1 from suitable sensors in the tank 104 to determine a present hydrogen pressure in the hydrogen tank according to step S102 of the flow-chart in FIG. 2. The pressure may equally well be estimated from other parameters or models.

In step S104 of the computer-implemented method a present requested engine torque and speed is determined by the control unit 120. The speed is the revolutions per minute of the engine 2. The control unit 120 may receive a message S2 indicating the requested engine torque and speed from an engine/drive control system 118.

In step S106, a target injection pressure for injecting hydrogen into the engine combustion chamber 103 is determined using a model.

The model 122 may be predetermined and is accessible to the control unit 122 either on a memory 124 of the vehicle, or via an online server.

The model 122 is comprised of a set of mappings, being functions describing relationships that affect the injection pressure while at the same time have an impact on the vehicle propulsion and/or engine system efficiency.

Figure 4:
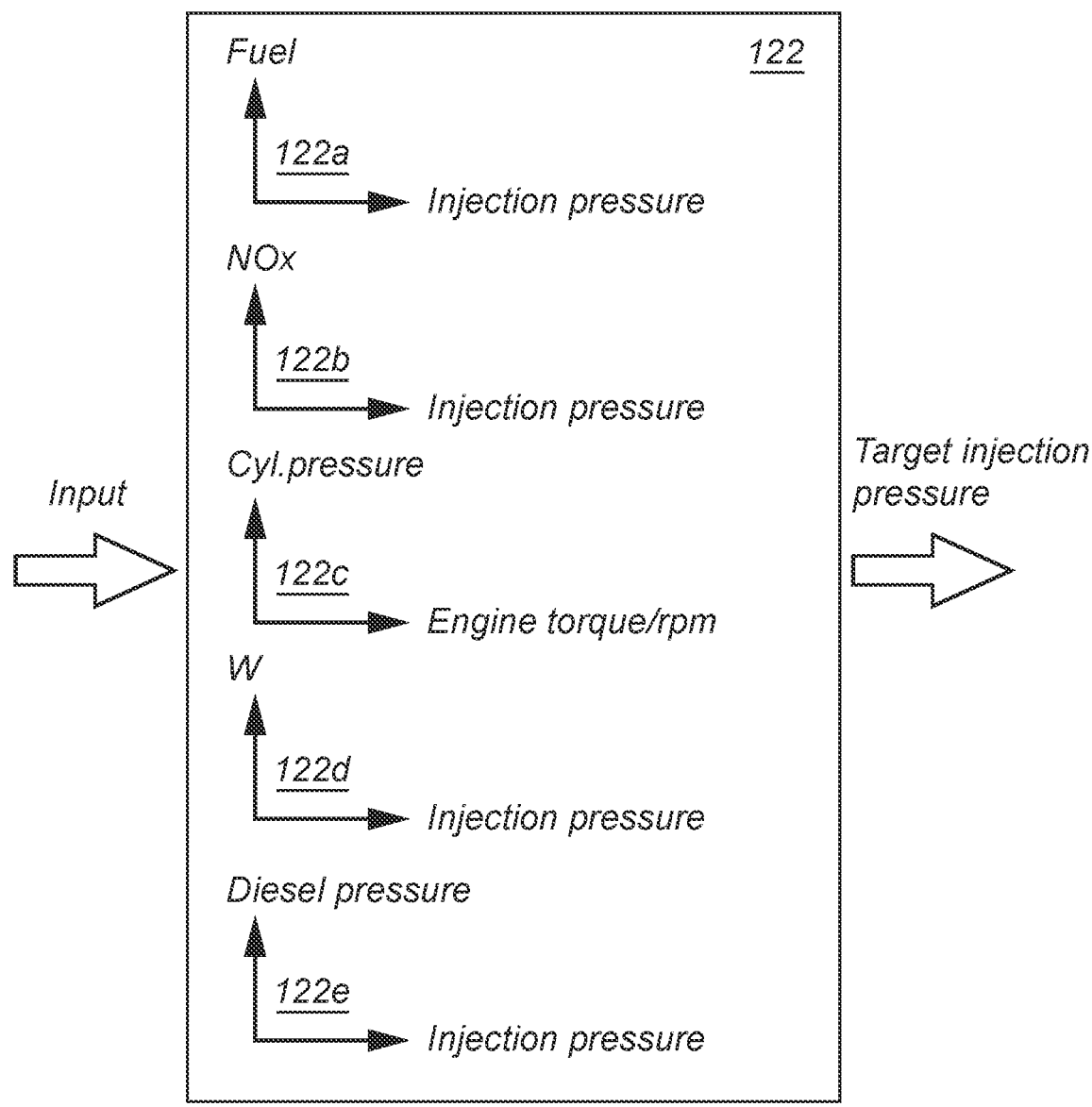
FIG. 4 conceptually illustrates the model according to examples of the disclosure.

As conceptually shown in FIG. 4, the model 122 comprises at least:
- a mapping 122*a* of engine fuel consumption as a function of injection pressure;
- a mapping 122*b* between NOx emission as a function of injection pressure,
- a mapping 122*c* of in-cylinder pressure as a function of engine torque and speed; and
- a mapping 122*d* of compressor mechanical work required to eject and compress hydrogen from the hydrogen tank as a function of injection pressure.

Optionally, the model 122 further comprises a mapping 122*e* between a diesel pressure used for hydrogen ignition and injection pressure. The diesel may be used by the ignition device 114 to ignite the hydrogen gas in the combustion chamber 103.

The mappings 122*a-d* may be theoretically modelled, or empirically determined from experimental data or from data measured while the vehicle 2 travels. The mappings 122*a-e* may further be provided as look-up tables in some examples. Thus, the mappings may be realized in many different ways.

With the mappings 122*a-d/e* the model 122, the control unit 122 determines the target injection pressure as the injection pressure that minimizes the mechanical work of the compressor described in mapping 122*d*, that provides an in-cylinder pressure sufficient for the engine to provide the requested engine torque and speed, that provides NOx emission below a predetermined maximum NOx emission level, and that reduces engine fuel consumption. In other words, a constraint to the injection pressure may be set by the predetermined maximum NOx emission level, and another constraint may be set by in-cylinder pressure. Thus, it is desirable to maintain below give NOx levels as may be set by for example legal limits, possibly with a margin. Further, it is preferred if the requested torque can be provided, thereby setting a constraint on the injection pressure. The fuel consumption and the mechanical work is minimized given these constraints. The control unit 122 evaluates the mappings 122*a-d/e* until the target injection pressure is an optimized injection pressure that fulfil the above. Thus, the target injection pressure is the injection pressure that provides the lowest amount of fuel needed to fulfil an engine torque request with the lowest efficiency loss in a compressor providing the injection pressure.

In examples where the mapping 122e is included a further constraint on the injection pressure is set by a required diesel pressure. The required diesel pressure is the pressure needed for the ignition device 114 to inject and ignite the diesel in the combustion chamber 103. The diesel pressure should preferably exceed the in-cylinder pressure in the chamber 103. However, the hydrogen injection pressure should be lower than the required diesel pressure.

The inputs to the model include at least the present requested engine torque and speed, and the hydrogen tank pressure, and optionally the required diesel pressure.

When the optimal or target injection pressure is determined from the model 122, the control unit 120 adjusts the injector pressure according to the determined target injection pressure in step S108. For this, the control unit 120 transmits a control signal S3 to the control circuitry of the compressor 106.

Preferably, a step S102a of determining that the pressure in the hydrogen tank 104 is below a threshold temperature, and to only use the model 122 for determining the target injection pressure when the pressure in the hydrogen tank is below a pressure threshold. the pressure threshold is the in-cylinder pressure. Thus, it is only when the pressure in the hydrogen tank 104 drop below the in-cylinder pressure that the compressor 106 is needed for boosting the pressure in the tank 104. When the pressure in the tank 104 exceeds the in-cylinder pressure in the chamber 103, the pressure in tank itself is sufficient to overcome the including pressure to inject the hydrogen gas in the chamber 103. Further, it is understood that adjusting the injector pressure is performed by controlling, by the control unit 120, an operation of a compressor 106 arranged to control the pressure in the hydrogen tank 104.

Still further, an optional step S101 may be included to first evaluate a present engine aftertreatment system temperature. The control unit 120 initiates the subsequent steps only when the engine aftertreatment system temperature exceeds a threshold indicating that the engine aftertreatment system is operative. The control unit 120 may receive temperature readings from sensors arranged in the aftertreatment system.

In examples, each mapping 122a-e has an associated weighting factor to adjust the relative importance between the maps 122a-e, at least two of the weighting factors being different from each other. The weights provide for, depending on the circumstances such as driving conditions including altitude, weather, remain fuel, distance to destination, road conditions, etc, adjust the impact of different maps. Generally, the target injection pressure may depend on a given driving condition of the vehicle. In a similar way, the model 122 may include assigned boundaries for each mapping, such as upper and/or lower levels for some maps which may facilitate the calculation of the target injection pressure within reasonable boundaries of the maps 122a-e.

In one example, the model 122 includes a self-learning algorithm configured to adapt the injector pressure based on the amount of fuel in the tank. The self-learning algorithm will store information on the truck operator behaviour, for instance how frequently he/she will refill the truck, to understand how critical it is to save fuel to ensure the conclusion of the journey. The algorithm may also be configured to learn which is the most common route for the truck and if the route is often the same, then it will optimize the fuel consumption based on the length, distance between refilling stations and topology of the route.

In one example, the model is configured to collect data of compressor usage, and to further adapt the injector pressure based on average usage of the compressor. For example, the algorithm can predict any change in the route topology to predict when it is more beneficial to compress hydrogen and also when it is the best time to stop compressing.

There is further provided a control unit 102 for controlling direct injection of hydrogen fuel into an engine cylinder of a vehicle from a hydrogen tank via an injector system 100. The control unit: determines a present hydrogen pressure in the hydrogen tank, determines a present requested engine torque and speed, determines a target injection pressure for injecting hydrogen into the engine combustion chamber using a model that includes at least: a mapping of engine fuel consumption as a function of injection pressure; a mapping between NOx emission as a function of injection pressure, a mapping of in-cylinder pressure as a function of engine torque and speed; a mapping of compressor mechanical work required to eject and compress hydrogen from the hydrogen tank as a function of injection pressure; wherein, the target injection pressure is the injection pressure that, according to the model, minimizes the mechanical work of the compressor, that provides an in-cylinder pressure sufficient for the engine to provide the requested engine torque and speed, that provides NOx emission below a predetermined maximum NOx emission level, and that reduces engine fuel consumption, wherein the control unit 120 further adjusts the injector pressure according to the determined target injection pressure.

There is further provided a computer program product comprising program code for performing, when executed by the processor device, the program code comprising: code for determining a present hydrogen pressure in the hydrogen tank; code for determining a present requested engine torque and speed; code for determining a target injection pressure for injecting hydrogen into the engine combustion chamber using a model that includes at least: a mapping of engine fuel consumption as a function of injection pressure; a mapping between NOx emission as a function of injection pressure, a mapping of in-cylinder pressure as a function of engine torque and speed; a mapping of compressor mechanical work required to eject and compress hydrogen from the hydrogen tank as a function of injection pressure; wherein, the target injection pressure is the injection pressure that, according to the model, minimizes the mechanical work of the compressor, that provides an in-cylinder pressure sufficient for the engine to provide the requested engine torque and speed, that provides NOx emission below a predetermined maximum NOx emission level, and that reduces engine fuel consumption, and code for adjusting the injector pressure according to the determined target injection pressure.

There is further provided a non-transitory computer-readable storage medium comprising instructions, which when executed by the processor device, cause the processor device to perform the method comprising: determining a present hydrogen pressure in the hydrogen tank; determining a present requested engine torque and speed; determining a target injection pressure for injecting hydrogen into the engine combustion chamber using a model that includes at least: a mapping of engine fuel consumption as a function of injection pressure; a mapping between NOx emission as a function of injection pressure, a mapping of in-cylinder pressure as a function of engine torque and speed; a mapping of compressor mechanical work required to eject and compress hydrogen from the hydrogen tank as a function of injection pressure; wherein, the target injection pressure is the injection pressure that, according to the model, minimizes the mechanical work of the compressor, that provides an in-cylinder pressure sufficient for the engine to provide the requested engine torque and speed, that provides NOx emission below a predetermined maximum NOx emission level, and that reduces engine fuel consumption, wherein the method further comprises: adjusting the injector pressure according to the determined target injection pressure.

Figure 5:
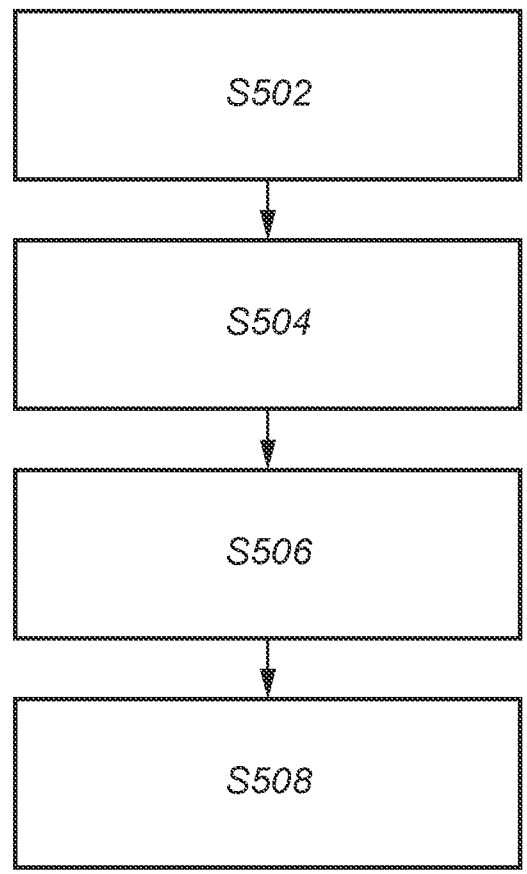
FIG. 5 is a flow-chart of method steps according to examples of the disclosure.

FIG. 5 is a flow-chart of a computer-implemented method for controlling direct injection of hydrogen fuel into an engine cylinder of a vehicle from a hydrogen tank via an injector system, the method comprising a step S502 of determining a present hydrogen pressure in the hydrogen tank, step S504 of determining a present requested engine torque and speed, step S506 of determining a target injection pressure for injecting hydrogen into the engine combustion chamber using a model that includes at least: a mapping of engine fuel consumption as a function of injection pressure; a mapping between NOx emission as a function of injection pressure, a mapping of in-cylinder pressure as a function of engine torque and speed; a mapping of compressor mechanical work required to eject and compress hydrogen from the hydrogen tank as a function of injection pressure; wherein, the target injection pressure is the injection pressure that, according to the model, minimizes the mechanical work of the compressor, that provides an in-cylinder pressure sufficient for the engine to provide the requested engine torque and speed, that provides NOx emission below a predetermined maximum NOx emission level, and that reduces engine fuel consumption, wherein the method further comprises step S508: adjusting the injector pressure according to the determined target injection pressure.

Figure 6:
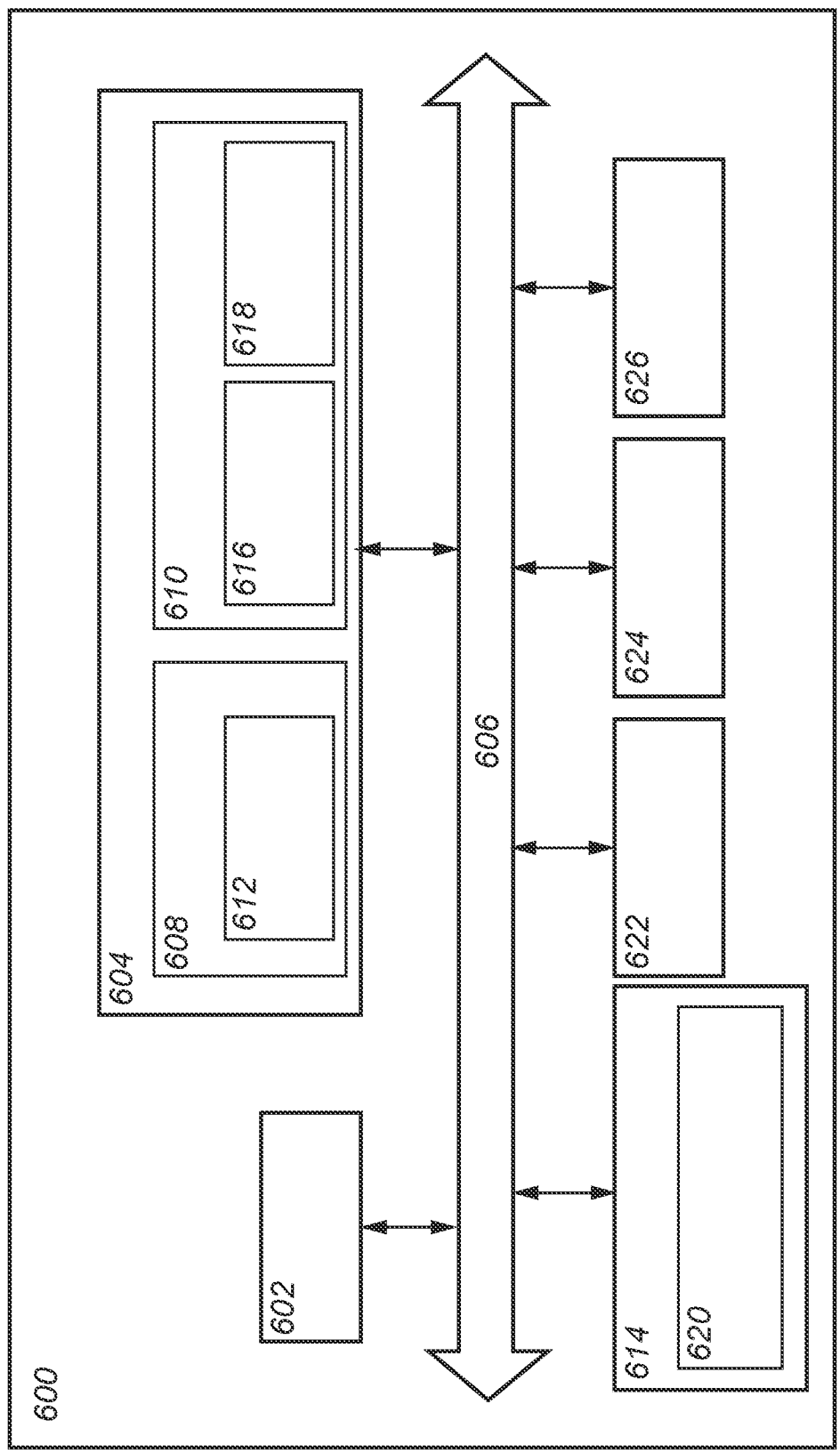
FIG. 6 is a schematic diagram of a computer system for implementing examples disclosed herein.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 926 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer-implemented method for controlling direct injection of hydrogen fuel into an engine cylinder of a vehicle from a hydrogen tank via an injector system, the method comprising:
   determining a present hydrogen pressure in the hydrogen tank;
   determining a present requested engine torque and speed;
   determining a target injection pressure for injecting hydrogen into the engine combustion chamber using a model that includes at least:
      a mapping of engine fuel consumption as a function of injection pressure;
      a mapping between NOx emission as a function of injection pressure,
      a mapping of in-cylinder pressure as a function of engine torque and speed;
      a mapping of compressor mechanical work required to eject and compress hydrogen from the hydrogen tank as a function of injection pressure;
   wherein, the target injection pressure is the injection pressure that, according to the model, minimizes the mechanical work of the compressor, that provides an in-cylinder pressure sufficient for the engine to provide the requested engine torque and speed, that provides NOx emission below a predetermined maximum NOx emission level, and that reduces engine fuel consumption,
   wherein the method further comprises:
   adjusting the injector pressure according to the determined target injection pressure.

2. The computer-implemented method according to claim 1, wherein each mapping has an associated weighting factor to adjust the relative importance between the maps, at least two of the weighting factors being different from each other.

3. The computer-implemented method according to claim 1, wherein the model includes assigned boundaries for each mapping.

4. The computer-implemented method according to claim 1, wherein the model further includes a mapping between a diesel pressure used for hydrogen ignition and injection pressure, wherein a further constraint for determining the target injection pressure is set by a required diesel pressure.

5. The computer-implemented method according to claim 4, wherein a further constraint is the hydrogen injection pressure is lower than the required diesel pressure.

6. The computer-implemented method according to claim 1, comprising determining a present engine aftertreatment system temperature, wherein when the method is only operative when the engine aftertreatment system temperature exceeds a threshold indicating that the engine aftertreatment system is operative.

7. The computer-implemented method according to claim 1, comprising determining that the pressure in the hydrogen tank is below a pressure threshold, and only use the model for determining the target injection pressure when the pressure in the hydrogen tank is below a pressure threshold.

8. The computer-implemented method according to claim 7, wherein the pressure threshold is the in-cylinder pressure.

9. The computer-implemented method according to claim 1, wherein the model includes a self-learning algorithm configured to adapt the injector pressure based on the amount of fuel in the tank.

10. The computer-implemented method according to claim 1, wherein the model is configured to collect data of compressor usage, and to further adapt the injector pressure based on average usage of the compressor.

11. The computer-implemented method according to claim 1, wherein the target injection pressure is the injection pressure that provides the lowest amount of fuel needed to fulfil an engine torque request with the lowest efficiency loss in a compressor providing the injection pressure.

12. The computer-implemented method according to claim 1, wherein the model is predetermined and loaded on a memory of the vehicle.

13. The computer-implemented method according to claim 1, wherein the target injection pressure depends on a given driving condition of the vehicle.

14. The computer-implemented method according to claim 1, wherein adjusting the injector pressure is performed by controlling an operation of a compressor arranged to control the injector pressure.

15. A control unit for controlling direct injection of hydrogen fuel into an engine cylinder of a vehicle from a hydrogen tank via an injector system, the control unit being configured to perform the steps of the method according to claim 1.

16. An injector system for direct injection of hydrogen into an engine cylinder of a vehicle from a hydrogen tank, the system comprising:
an injector;
a hydrogen tank connected to the injector with a transfer line to supply hydrogen gas to the injector, and
a control unit according to claim 15.

17. A vehicle comprising the injector system according to claim 16.

18. A computer program product comprising program code for performing, when executed by the processor device, the method of claim 1 when the program is run on a computer.

19. A non-transitory computer-readable storage medium comprising instructions, which when executed by a processor device, cause the processor device to perform the method of claim 1.

* * * * *